US012646193B2

(12) United States Patent
Lee

(10) Patent No.: US 12,646,193 B2
(45) Date of Patent: Jun. 2, 2026

(54) DEEP INFORMATION PROCESSING METHOD AND DEEP INFORMATION PROCESSING SYSTEM USING THE SAME

(71) Applicant: eYs3D Microelectronics, Co., Taipei City (TW)

(72) Inventor: Chi-Feng Lee, Taipei City (TW)

(73) Assignee: eYs3D Microelectronics, Co., Taipei City (TW)

( * ) Notice: Subject to any disclaimer, the term of this patent is extended or adjusted under 35 U.S.C. 154(b) by 418 days.

(21) Appl. No.: 18/386,151

(22) Filed: Nov. 1, 2023

(65) Prior Publication Data

US 2024/0144508 A1 May 2, 2024

Related U.S. Application Data

(60) Provisional application No. 63/421,181, filed on Nov. 1, 2022.

(51) Int. Cl.
G06T 7/593 (2017.01)
G01S 7/4911 (2020.01)
(Continued)

(52) U.S. Cl.
CPC ............ G06T 7/593 (2017.01); G01S 7/4911 (2013.01); G01S 7/4915 (2013.01); G01S 17/32 (2013.01);
(Continued)

(58) Field of Classification Search
CPC .. G06T 7/593; G06T 3/14; G06T 3/20; G06T 5/20; G06T 5/50; G06T 2207/10028;
(Continued)

(56) References Cited

U.S. PATENT DOCUMENTS 9,542,750 B2 * 1/2017 Muninder ............... G06T 7/593
12,524,896 B2 * 1/2026 Seo .......................... G06T 7/593
(Continued)

OTHER PUBLICATIONS

Wartell, Zachary Justin, Larry F. Hodges, and William Ribarsky. "An analytic comparison of alpha-false eye separation, image scaling and image shifting in stereoscopic displays." (2000), https://repository.gatech.edu/server/api/core/bitstreams/986bfecb-223d-44a6-83a0-1e5aa9ccad61/content (Year: 2000).*
(Continued)

*Primary Examiner* — Chan S Park
*Assistant Examiner* — Paulo Andres Garcia
(74) *Attorney, Agent, or Firm* — Innovation Counsel LLP

(57) ABSTRACT

A depth information processing method and a depth information processing system using the same are provided. The method includes the following steps. A pixel shifting process is performed on a first image and a second image of an original image group to obtain a zero-shifted first image and a shifted second image of a shifted image group. The original image group and the shifted image group are combined to obtain a combined image. A depth information processing is performed on the combined image to obtain an initial depth information. The initial depth information has a basic depth information corresponding to the original image group and a compensated depth information corresponding to the shifted image group. A numerical restoration process is performed on the compensated depth information to obtain a restored depth information. The basic depth information and the restored depth information are fused to obtain a fused depth information.

19 Claims, 9 Drawing Sheets

(51) Int. Cl.

| | |
|---|---|
| *G01S 7/4915* | (2020.01) |
| *G01S 17/32* | (2020.01) |
| *G06T 3/14* | (2024.01) |
| *G06T 3/20* | (2006.01) |
| *G06T 5/20* | (2006.01) |

(52) U.S. Cl.
CPC .................. *G06T 3/14* (2024.01); *G06T 3/20* (2013.01); *G06T 5/20* (2013.01); *G06T 2207/10028* (2013.01); *G06T 2207/20221* (2013.01); *G06T 2207/20228* (2013.01)

(58) Field of Classification Search
CPC . G06T 2207/20221; G06T 2207/20228; G01S 7/4911; G01S 7/4915; G01S 17/32
See application file for complete search history.

(56) References Cited

U.S. PATENT DOCUMENTS

| | | | |
|---|---|---|---|
| 2007/0189750 A1 | 8/2007 | Wong et al. | |
| 2012/0206578 A1* | 8/2012 | Yang | G06T 15/205 348/47 |
| 2012/0236114 A1 | 9/2012 | Chang et al. | |
| 2013/0155050 A1* | 6/2013 | Rastogi | H04N 25/671 345/419 |
| 2015/0030235 A1* | 1/2015 | Someya | H04N 13/128 382/154 |
| 2015/0092992 A1 | 4/2015 | Ishihara | |
| 2015/0170400 A1 | 6/2015 | Sietz et al. | |
| 2015/0208057 A1 | 7/2015 | Wu et al. | |
| 2017/0039686 A1 | 2/2017 | Miura et al. | |
| 2017/0109940 A1 | 4/2017 | Guo et al. | |
| 2018/0130255 A1 | 5/2018 | Hazeghi et al. | |
| 2019/0228537 A1* | 7/2019 | Sekiguchi | G01S 17/931 |
| 2020/0051265 A1 | 2/2020 | Kim et al. | |
| 2023/0177709 A1* | 6/2023 | Lee | G06T 5/50 382/106 |
| 2025/0200710 A1* | 6/2025 | Feng | H04N 23/73 |

OTHER PUBLICATIONS

Taiwan Office Action issued by the TIPO corresponding to application No. 110113704 on Dec. 30, 2021, 11 pages.

United States Office Action issued by the USPTO corresponding to U.S. Appl. No. 17/233,241 on Oct. 8, 2021, 14 pages.

United States Office Action issued by the USPTO corresponding to U.S. Appl. No. 17/233,241 on Aug. 30, 2022, 15 pages.

United States Office Action issued by the USPTO corresponding to U.S. Appl. No. 17/233,241 on Mar. 23, 2023, 15 pages.

United States Office Action issued by the USPTO corresponding to U.S. Appl. No. 17/233,241 on Sep. 7, 2023, 16 pages.

* cited by examiner

DEEP INFORMATION PROCESSING METHOD AND DEEP INFORMATION PROCESSING SYSTEM USING THE SAME

This application claims the benefit of U.S. provisional application Ser. No. 63/421,181, filed Nov. 1, 2022, the disclosure of which is incorporated by reference herein in its entirety.

TECHNICAL FIELD

The disclosure relates in general to a processing method and a processing system using the same, and more particularly to a deep information processing method and a deep information processing system using the same.

BACKGROUND

With the evolution of display technology, a stereoscopic imaging technology has been developed. A stereoscopic camera can capture a left-eye image and a right-eye image, and obtain a depth information map through analysis of the left-eye image and right-eye image.

However, when processing the left-eye image and the right-eye image, a fixed predetermined disparity search range is used for analysis. It is possible that all pixels cannot be matched within the predetermined disparity search range, and the deep information corresponding the pixel cannot be obtained.

SUMMARY

The disclosure is directed to a deep information processing method and a deep information processing system using the same. By applying pre-processing technologies such as translation and filtering to the images, and then using disparity search range control technology, the situation where some pixels or blocks cannot be matched correctly can be improved. Finally, complete fused depth information can be fused via fusion technology.

According to one embodiment, a depth information processing method is provided. The depth information processing method includes the following steps: obtaining a first image and a second image of an original image group; performing a pixel shifting process on the original image group, to obtain a zero-shifted first image and a shifted second image of a shifted image group, wherein the zero-shifted first image is identical to the first image, the shifted second image is shifted by N pixels relative to the second image, and N is a positive integer; combining the original image group and the shifted image group, to obtain a combined image; performing a depth information processing on the combined image by using a predetermined disparity search range, to obtain an initial depth information, wherein the initial depth information has a basic depth information corresponding to the original image group and a compensated depth information corresponding to the shifted image group; dismantling the initial depth information to be the basic depth information and the compensated depth information; performing a numerical restoration process on the compensated depth information to obtain a restored depth information; and fusing the basic depth information and the restored depth information, to obtain a fused depth information.

According to another embodiment, a depth information processing method is provided. The depth information processing method includes the following steps: obtaining a first image and a second image of an original image group; performing a low-pass filtering process on the original image group to obtain a non-filtered first image and a filtered second image of a filtered image group, wherein the non-filtered first image is identical to the first image; combining the original image group and the filtered image group to obtain a combined image; performing a depth information processing on the combined image of the original image group by using a predetermined disparity search range, and performing the depth information processing on the combined image of the filtered image group by using an expanded disparity search range to obtain an initial depth information, wherein the initial depth information has a basic depth information corresponding to the original image group and a compensated depth information corresponding to the filtered image group, the expanded disparity search range is N times the predetermined disparity search range, and N is a positive integer; dismantling the initial depth information to be the basic depth information and the compensation depth information; performing a numerical restoration process on the compensation depth information; and fusing the basic depth information and the compensated depth information to obtain a fused depth information.

According to an alternative embodiment, a depth information processing system is provided. The depth information processing system includes a converting unit, a combining unit, a depth generating unit, a dismantling unit, a restoring unit and a fusing unit. The converting unit is used to perform a pixel shifting process on a first image and a second image of an original image group, to obtain a zero-shifted first image and a shifted second image of a shifted image group. The zero-shifted first image is identical to the first image. The shifted second image is shifted by N pixels relative to the second image. N is a positive integer. The combining unit is used to combine the original image group and the shifted image group, to obtain a combined image. The depth generating unit is used to perform a depth information processing on the combined image by using a predetermined disparity search range, to obtain an initial depth information. The initial depth information has a basic depth information corresponding to the original image group and a compensated depth information corresponding to the shifted image group. The dismantling unit is used to dismantle the initial depth information to be the basic depth information and the compensated depth information. The restoring unit is used to perform a numerical restoration process on the compensated depth information, to obtain a restored depth information. The fusing unit is used to fuse the basic depth information and the restored depth information, to obtain a fused depth information.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

The following disclosure provides various features for implementing some embodiments or examples of the disclosure. Specific examples of components and configurations are described below to simplify some embodiments of the disclosure. Of course, these components and configurations are examples only and are not intended to be limiting. For example, in the following description, the formation of a first feature over or on a second feature may include embodiments in which the first and second features are in direct contact, and may also include embodiments in which additional features may be formed between the first feature and the second feature, so that the first feature and the second feature are not in direct contact. Additionally, some embodiments of the present disclosure may repeat reference symbols and/or letters in various instances. This repetition is for simplicity and clarity and does not in itself identify the various embodiments and/or configurations discussed.

Figure 1:
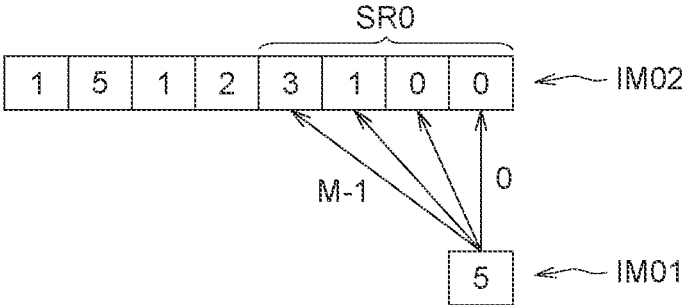
FIG. 1 illustrates a schematic diagram of a predetermined disparity search range SR0 according to an embodiment.

Please refer to FIG. 1, which illustrates a schematic diagram of a predetermined disparity search range SR0 according to an embodiment. The depth information described in this disclosure could be any depth information. For example, the depth information can be a depth map (disparity or distance or phase), or a point cloud (coordinates), or data generated by any depth device. Stereoscopic vision, Time of Flight (ToF), Lidar, Radar, or sound waves, etc. are included in the depth information. When performing depth information processing, a first image IM01 and a second image IM02 need to be matched with pixels or blocks. Each square in the FIG. 1 represents a pixel, and the number within the square represents the pixel value. The first image IM01 and the second image IM02 are, for example, a left eye image and a right eye image; or, the first image IM01 and the second image IM02 are, for example, a right eye image and a left eye image. Under the limitations of hardware or software, a predetermined disparity search range SR0 is, for example, 0 to M−1. M is a positive integer. In the example in the FIG. 1, M is 4. It can be found from the FIG. 1 that within the predetermined disparity search range SR0, some pixels or some blocks of the first image IM01 and the second image IM02 may not be correctly matched.

Figure 2:
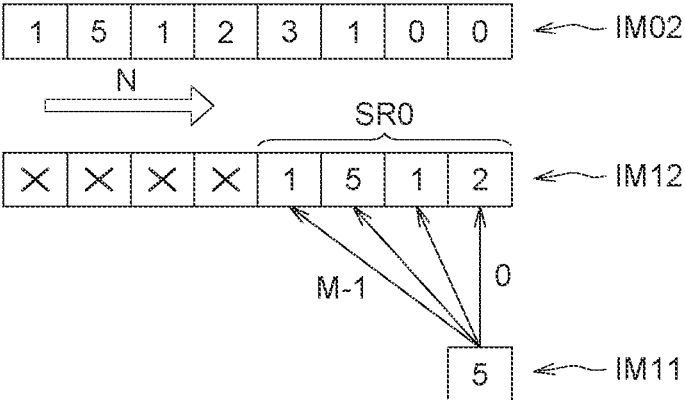
FIG. 2 illustrates a schematic diagram of a pixel shifting process according to an embodiment.

Please refer to FIG. 2, which illustrates a schematic diagram of a pixel shifting process according to an embodiment. In this embodiment, the second image IM02 is shifted by N pixels, and a shifted second image IM12 is obtained after the pixel shifting process. N is a positive integer. In the example in the FIG. 2, N is 4 and the pixels are shifted to the right. The first image IM01 (shown in the FIG. 1) is not shifted, and a zero-shifted first image IM11 is obtained. After obtaining the zero-shifted first image IM11 and the shifted second image IM12, pixel or block matching could be performed on the zero-shifted first image IM11 and the shifted second image IM12. It can be found from FIG. 2 that within the predetermined disparity search range SR0, pixels or blocks that cannot be paired originally can be correctly paired in the zero-shifted first image IM11 and the shifted second image IM12.

In the present embodiment, the above technology is used to perform depth information processing to improve the situation where some pixels or blocks cannot be correctly matched.

Figure 3:
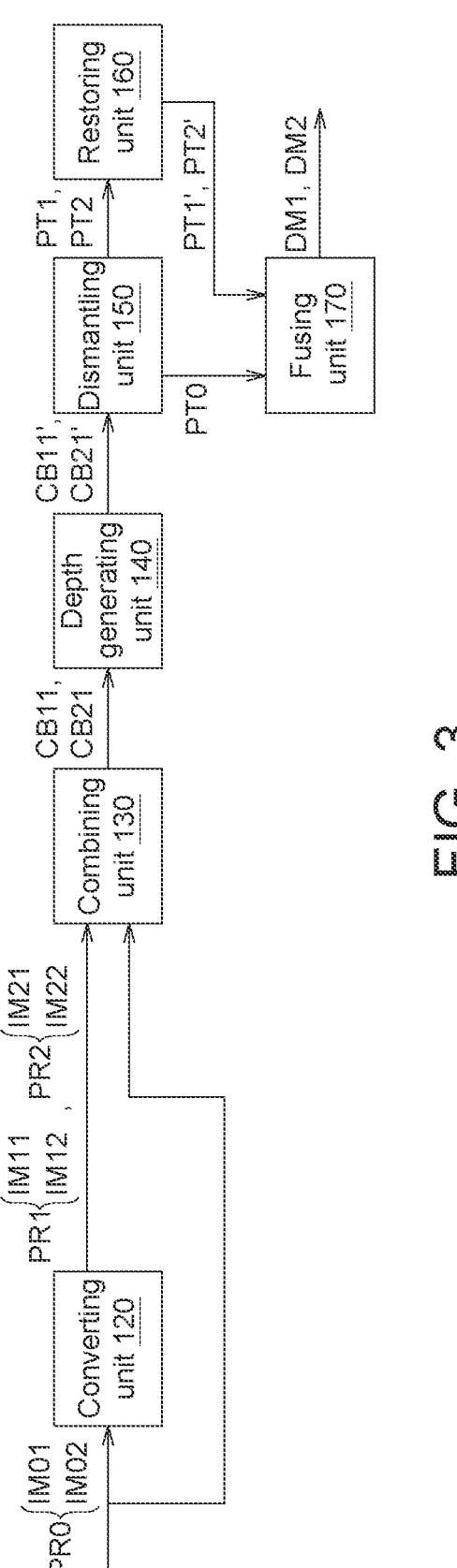
FIG. 3 illustrates a block diagram of a depth information processing system 100 according to an embodiment.

Please refer to FIG. 3, which illustrates a block diagram of a depth information processing system 100 according to one embodiment. The depth information processing system 100 includes a converting unit 120, a combining unit 130, a depth generating unit 140, a dismantling unit 150, a restoring unit 160 and a fusing unit 170. The converting unit 120 is used to perform conversion of the image content, such as a circuit, a chip, a circuit board or a storage or computing device with program code. The combining unit 130 is used to combine images, such as a circuit, a chip, a circuit board or a storage or computing device with program code. The converting unit 120 and the combining unit 130 are, for example, two independent components, or may be integrated into the same component. The depth generating unit 140 is used to perform depth information processing, such as a circuit, a chip, a circuit board or a storage or computing device with program code. The dismantling unit 150 is used to di dismantle an image, such as a circuit, a chip, a circuit board or a storage or computing device with program code. The restoring unit 160 is used to perform the pixel restoration process, such as a circuit, a chip, a circuit board or a storage or computing device with program code. The fusing unit 170 is used to execute information fusion processes, such as a circuit, a chip, a circuit board or a storage or computing device with program code. In this embodiment, some pre-processing techniques such as shifting and filtering are applied to the image, and the disparity search range is controlled, so that the situation where some pixels or blocks cannot be correctly matched is improved. The operation of those elements is further explained in detail with a flow chart below.

Figure 4:
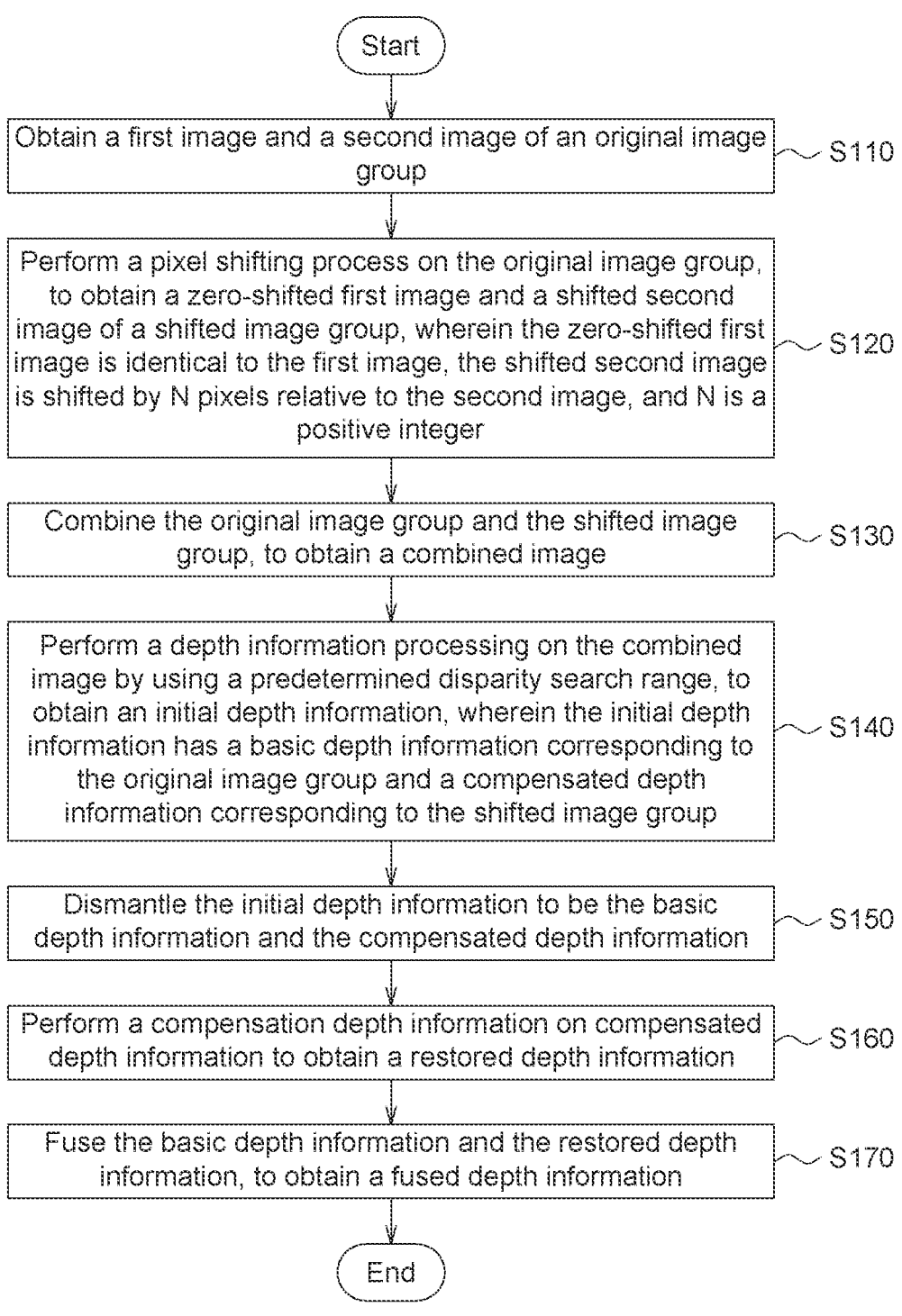
FIG. 4 illustrates a flow chart of a depth information processing method according to an embodiment.
Figures 5, 6:
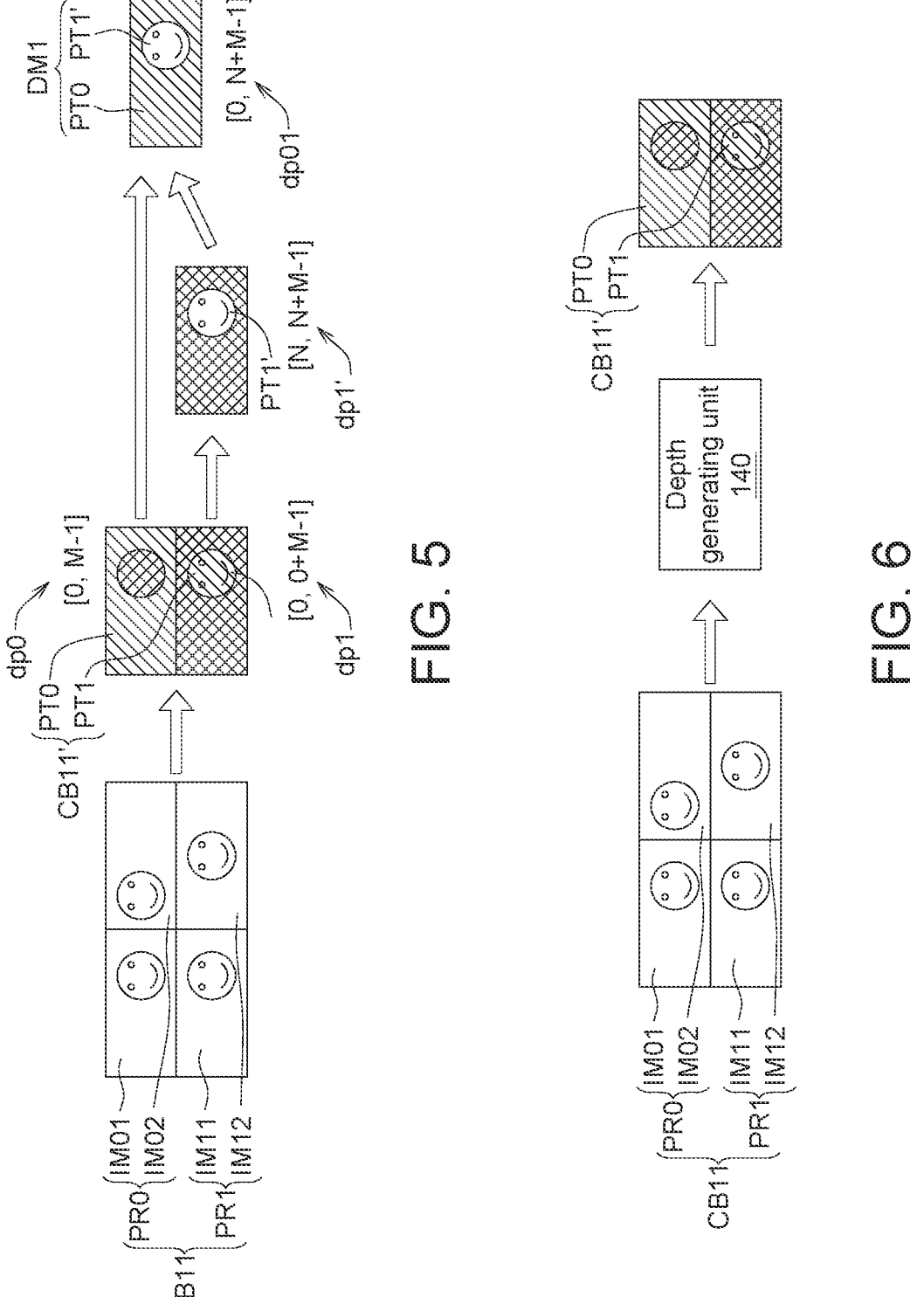
FIG. 5 illustrates an example of executing each step of the depth information processing method in the FIG. 4.
FIG. 6 illustrates a schematic diagram of one depth generating unit 140 processing a combined image CB11 including an original image group PR0 and a shifted image group PR1 according to an embodiment.

Please refer to FIGS. 3 to 5. FIG. 4 illustrates a flow chart of a depth information processing method according to an embodiment. FIG. 5 illustrates an example of executing each step of the depth information processing method in the FIG. 4. The depth information processing method includes steps S110 to S170. In the step S110 in the FIG. 4, as shown in FIGS. 3 and 5, the converting unit 120 obtains the first image IM01 and the second image IM02 of an original image group PR0. The first image IM01 and the second image IM02 of the original image group PR0 are, for example, the left eye image and the right eye image (or the right eye image and the left eye image). The first image group PR0 is, for example, an image captured by an image capture device, or an image corrected by a rectification unit. The rectification unit (not shown in the FIGURE) and the converting unit 120 could be integrated into the same component, or they could be two independent components. In addition, as mentioned above, the converting unit 120 and the combining unit 130 could be two independent components, or they could be integrated into the same component. Therefore, the rectification unit (not shown in the FIGURE), the converting unit 120 and the combining unit 130 could be arbitrarily integrated or independently arranged and combined.

Next, in the step S120 in the FIG. 4, as shown in the FIGS. 3 and 5, the converting unit 120 performs a pixel shifting process on the original image group PR0 to obtain a zero-shifted first image IM11 and a second image IM12 of a shifted image group PR1. As shown in the FIG. 5, the zero-shifted first image IM11 is the same as the first image IM01, and the shifted second image IM12 is shifted by N pixels relative to the second image IM02, and N is a positive integer.

Next, in the step S130 of the FIG. 4, as shown in the FIGS. 3 and 5, the combining unit 130 combines the original image group PR0 and the shifted image group PR1 to obtain at least one combined image CB11.

Then, in the step S140 of the FIG. 4, as shown in the FIGS. 3 and 5, the depth generating unit 140 performs a depth information processing on the combined image CB11 by using a predetermined disparity search range SR0 (shown in the FIG. 1) to obtain at least one initial depth information CB11'. The initial depth information CB11' has a basic depth information PT0 corresponding to the original image group PR0 and a compensated depth information PT1 corresponding to the shifted image group PR1. As shown in the FIG. 5, without adjusting the first image IM01 and the second image IM02, there may be some blocks (such as the block represented by diagonal grids) in the basic depth information PT0 generated based on the first image IM01 and the second image IM02 can be paired correctly to generate the valid depth information, while some blocks (such as the block represented by cross grids) cannot be paired correctly and the valid depth information cannot be generated. As shown in the FIG. 5, when the predetermined disparity search range SR0 is 0 to M−1, the basic depth information PT0 has a basic disparity range dp0 from 0 to 0+M−1.

As shown in the FIG. 5, the shifted second image IM12 has been shifted, so in the compensated depth information PT1 generated based on the zero-shifted first image IM11 and the shifted second image IM12, there may be some blocks (such as the block represented by diagonal grids) can be paired correctly to generate the valid depth information, but some blocks (such as the block represented by cross grids) cannot be paired correctly and the valid depth information cannot be generated. As shown in the FIG. 5, when the predetermined disparity search range SR0 is 0 to M−1, the compensated depth information PT1 has a compensation disparity range dp1 from 0 to M−1.

Next, in the step S150 in the FIG. 4, the dismantling unit 150 dismantles the initial depth information CB11' to be the basic depth information PT0 and the compensated depth information PT1.

In other embodiments, the depth information processing system 100 may not include the dismantling unit 150, and the restoring unit 160 and the fusing unit 170 may directly know the status of the basic depth information PT0 and the compensated depth information PT1 in the initial depth information CB11' and proceed directly.

Next, in the step S160 of the FIG. 4, as shown in the FIGS. 3 and 5, the restoring unit 160 performs a numerical restoration process on the compensated depth information PT1 to obtain a restored depth information PT1'. The numerical restoration process is used to add and subtract the depth information value of the compensated depth information PT1 to restore the impact of the pixel shifting process performed on the shifted second image IM12. As shown in the FIG. 5, when the predetermined disparity search range SR0 is 0 to M−1 and the shift amount is N, the restored depth information PT1' has a restored disparity range dp1' from N to N+M−1.

It should be noted that the restoring unit 160 mainly normalizes the compensation depth so that the units of the compensated depth information DPT1 and the basic depth information DPT0 are consistent. If the units of the depth information are originally consistent, there is no need to use the restore unit 160.

Then, in the step S170 in the FIG. 4, as shown in the FIGS. 3 and 5, the fusing unit 170 fuses the basic depth information PT0 and the restored depth information PT1' to obtain a fused depth information DM1. As shown in the FIG. 5, when the predetermined disparity search range SR0 is 0 to M−1 and the shift amount is N, the fused depth information DM1 has an integrated disparity range dp01 from 0 to N+M−1.

In the fusion technology, the fusing unit 170 will extract the valid information from the two corresponding depth information (if only one is valid) and output it. If both are valid, the depth information with higher accuracy will be outputted.

Through the above-mentioned pre-processing technology of image shifting, the situation in which some pixels or blocks cannot be correctly matched and cannot produce effective depth information can be improved in the depth information processing. Then, the fusion technology can be used to obtain a more complete and effective fused depth information DM1. In addition, the above depth information processing can be performed by one depth generating unit 140 or by multiple depth generating units 140. Please refer to the following description.

Please refer to FIG. 6, which illustrates a schematic diagram of one depth generating unit 140 processing the combined image CB11 including the original image group PR0 and the shifted image group PR1 according to an embodiment. In the FIG. 6, the original image group PR0 and the shifted image group PR1 could be combined into the combined image CB11. The original image group PR0 is arranged at the first row of the combined image CB11, and the shifted image group PR1 is arranged at the second row of the combined image CB11. One depth generating unit 140 could perform the depth information processing on the combined image CB11 to simultaneously obtain the basic depth information PT0 and the compensated depth information PT1.

Figures 7, 8:
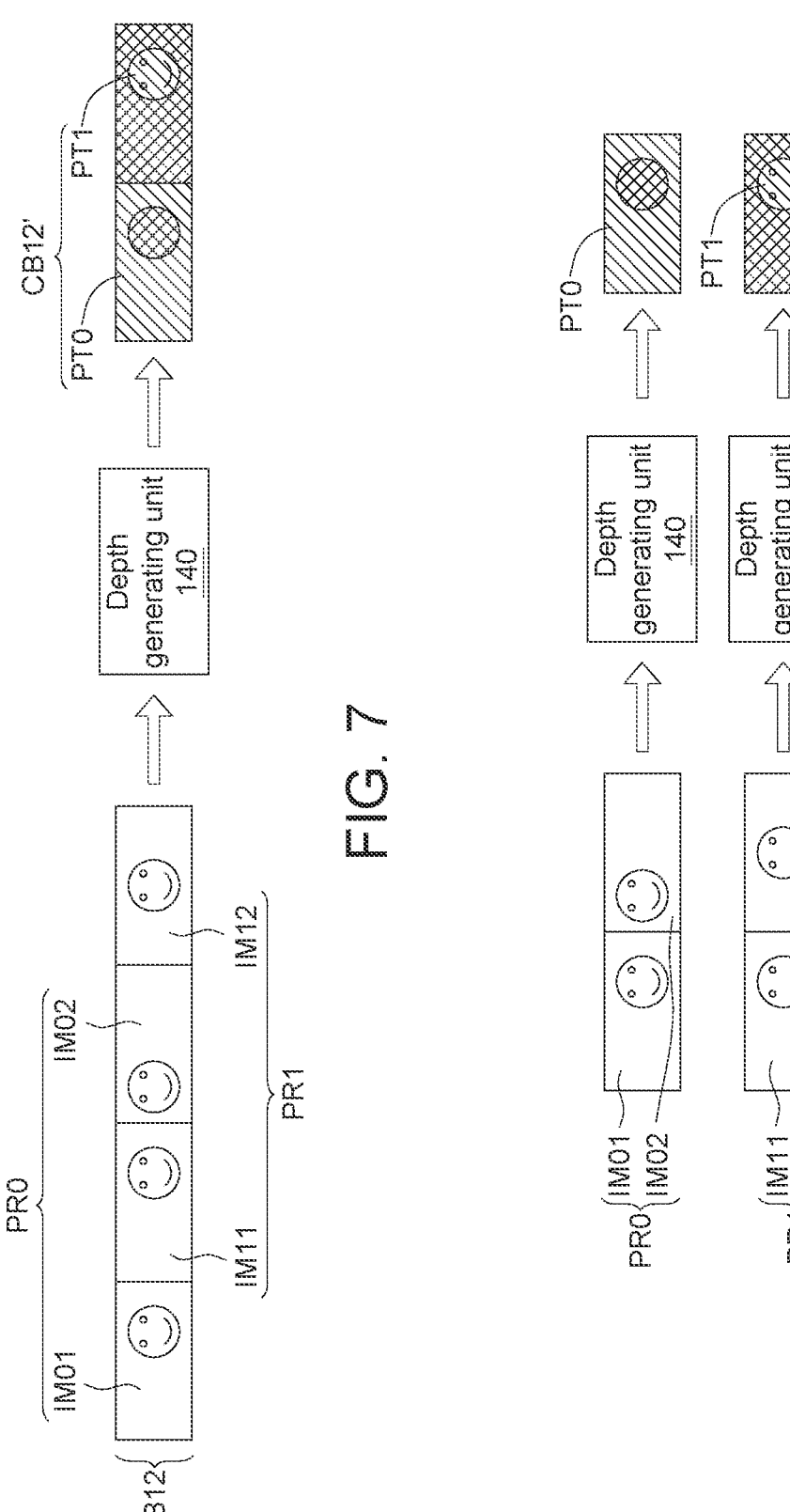
FIG. 7 illustrates a schematic diagram of one depth generating unit 140 processing a combined image CB12 including the original image group PR0 and the shifted image group PR1 according to another embodiment.
FIG. 8 illustrates a schematic diagram of two depth generating units 140 respectively processing a combined image CB130 including the original image group PR0 and a combined image CB131 including the shifted image group PR1 according to another embodiment.

Please refer to FIG. 7, which illustrates a schematic diagram of one depth generating unit 140 processing a combined image CB12 including the original image group PR0 and the shifted image group PR1 according to another embodiment. In the FIG. 7, the original image group PR0 and the shifted image group PR1 are combined into the combined image CB12. The first image IM01 of the original image group PR0, the zero-shifted first image IM11 of the shifted image group PR1, the second image IM02 of the original image group PR0 and the shifted second image IM12 of the shifted image group PR1 are arranged in sequence and are located at the same row of the combined image CB12. One depth generating unit 140 can perform depth information processing on the combined image CB12 to simultaneously obtain the basic depth information PT0 and the compensated depth information PT1.

Please refer to FIG. 8, which illustrates a schematic diagram of two depth generating units 140 processing the original image group PR0 and the shifted image group PR1 according to another embodiment. One depth generating unit 140 could perform the depth information processing on the first image IM01 and the second image IM02, and the other depth generating unit 140 could perform the depth information processing on the zero-shifted first image IM11 and the shifted second image IM12, to obtain the basic depth information PT0 and the compensated depth information PT1 respectively.

The above embodiment uses pre-processing technology, such as shifting, to improve the situation where some pixels or blocks cannot be correctly matched in the depth information processing. In another embodiment, the situation where some pixels or blocks cannot be correctly matched can also be improved by performing pre-processing techniques, such as filtering on the image, and the control of the disparity search range.

Figure 9:
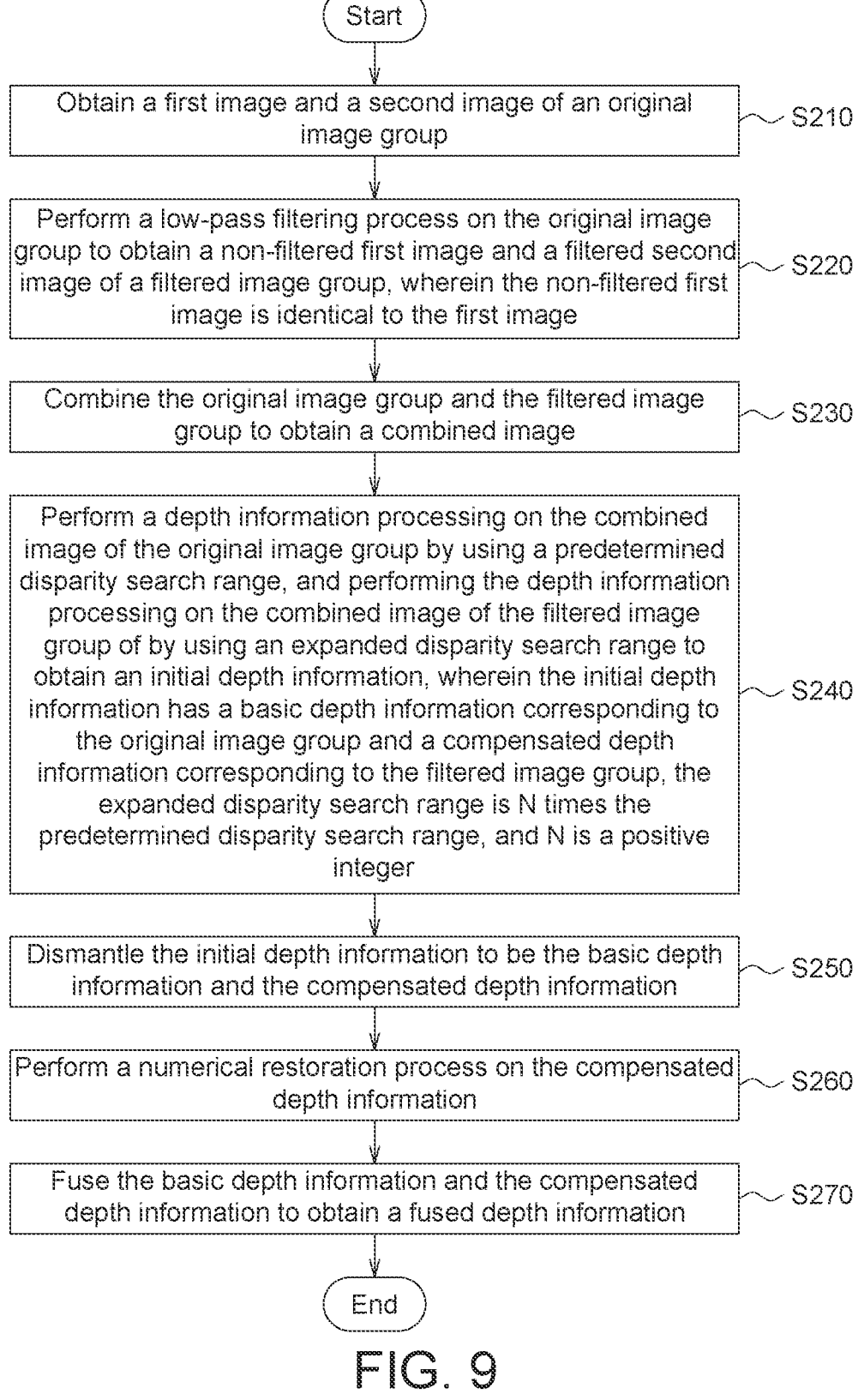
FIG. 9 illustrates a flow chart of a depth information processing method according to another embodiment.
Figure 10:
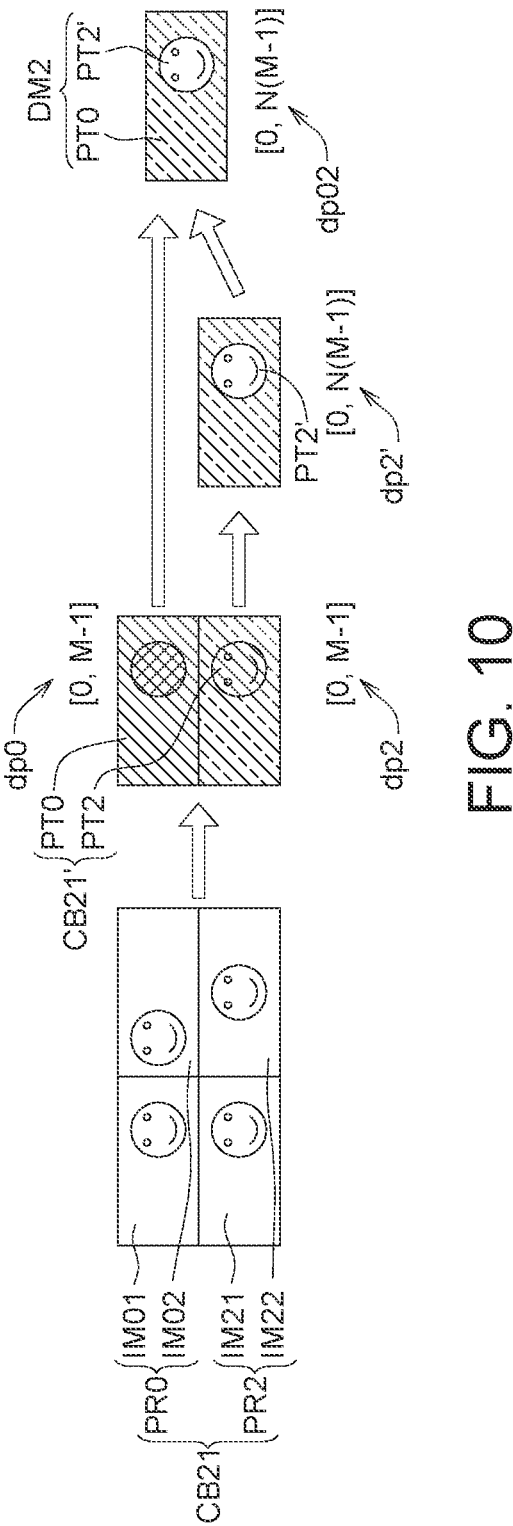
FIG. 10 illustrates an example of executing each step of the depth information processing method in the FIG. 9.

Please refer to FIGS. 3, 9, and 10. FIG. 9 illustrates a flow chart of a depth information processing method according to another embodiment. FIG. 10 illustrates an example of executing each step of the depth information processing method in the FIG. 9. The depth information processing method in the FIG. 9 includes steps S210 to S270. In the step S210 in the FIG. 9, as shown in the FIGS. 3 and 10, the converting unit 120 obtains the first image IM01 and the second image IM02 of the original image group PR0.

Then, in the step S220 of the FIG. 9, as shown in the FIGS. 3 and 10, the converting unit 120 performs a low-pass filtering process on the original image group PR0 to obtain a non-filtered first image IM21 and a filtered second image IM22 of the filtered image group PR2. The non-filtered first image IM21 is the same as the first image IM01. In the filtered second image IM22, the representation of each pixel among neighboring pixels is increased by N times. For example, when N is 2, the value of each pixel in the filtered second image IM22 could represent the values of two pixels including this pixel and the adjacent pixel.

Next, in the step S230 of the FIG. 9, as shown in the FIGS. 3 and 10, the combining unit 130 combines the original image group PR0 and the filtered image group PR2 to obtain at least one combined image CB21.

Then, in the step S240 of the FIG. 9, as shown in the FIGS. 3 and 10, the depth generating unit 140 performs the depth information processing on the original image group PR0 of the combined image CB12 by using a predetermined disparity search range SR0, and performs the depth information processing on the filtered image group PR2 of the combined image CB12 by using an expanded disparity search range SR2 (shown in FIG. 11) to obtain initial depth information CB21'. As shown in the FIG. 10, without adjusting the first image IM01 and the second image IM02, there may be some blocks (such as the block represented by diagonal grids) in the basic depth information PT0 generated based on first image IM01 and the second image IM02 can be paired correctly to generate valid depth information, while some blocks (such as the blocks represented by cross grids) cannot be paired correctly and the valid depth information cannot generated. As shown in the FIG. 10, when the predetermined disparity the search range SR0 is 0 to M−1, the basic depth information PT0 has a basic disparity range dp0 from 0 to 0+M−1.

Figure 11:
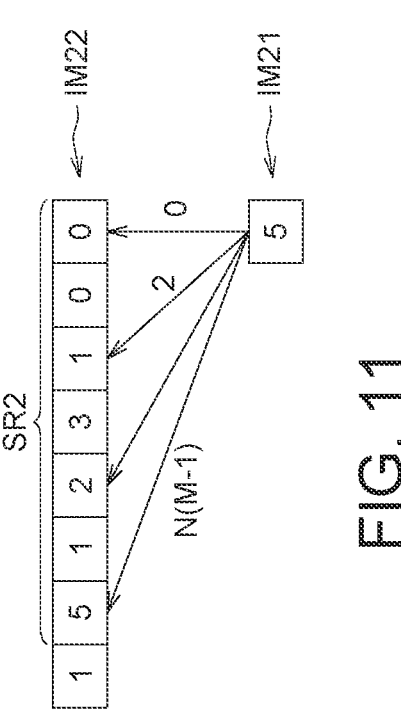
FIG. 11 illustrates a schematic diagram of an expanded disparity search range SR2 according to an embodiment.

Please refer to FIG. 11, which illustrates a schematic diagram of the expanded disparity search range SR2 according to an embodiment. The expanded disparity search range SR2 is N times the predetermined disparity search range SR0 (shown in the FIG. 1), and N is a positive integer. In the FIG. 11, N is 2 as an example. In the expanded disparity search range SR2 in the FIG. 11, the depth generating unit 140 performs a jump search every N pixels. In the filtered second image IM22, the representation of each pixel among neighboring pixels is increased by N times. When the jump search is performed for every N pixels, the depth generating unit 140 has the opportunity to search for pixels or image blocks that can be matched.

In other embodiments, the converting unit 120 may not be included in the system, and the low-pass filtering process may not be performed. In other words, the filtered image group PR2 can be essentially equal to the original image group PR0, and the compensated depth information PT2 can also be obtained by jump search for every N pixels within the expanded search range SR2.

As shown in the FIG. 10, under the expanded disparity search range SR2, in the compensated depth information PT2 generated based on the non-filtered first image IM21 and the filtered second image IM22, all blocks (such as the block represented by diagonal grids) could be paired correctly to generate the valid depth information, but the accuracy is worse than that of the basic depth information PT0. As shown in the FIG. 10, when the predetermined disparity search range SR0 is 0 to M−1 and the jump search is performed for every N pixels, the compensated depth information PT2 has a compensated disparity range dp2 from 0 to M−1.

Next, in the step S250 in the FIG. 9, as shown in the FIGS. 3 and 10, the dismantling unit 150 dismantles the initial depth information CB21' to be the basic depth information PT0 and the compensated depth information PT2.

In other embodiments, the depth information processing system 100 may not include the dismantling unit 150, and the restoring unit 160 and the fusing unit 170 may directly know the status of the basic depth information PT0 and the compensated depth information PT2 in the initial depth information CB21' and proceed directly.

Then, in the step S260 of FIG. 9, as shown in the FIGS. 3 and 10, the restoring unit 160 performs a numerical restoration process on the compensated depth information PT2. The numerical restoration process is used to expand (multiply) the depth information value of the compensated depth information PT2 to restore the impact of the jump search within the expanded disparity search range SR2. As shown in the FIG. 10, when the predetermined disparity search range SR0 is 0 to M−1 and the expansion magnification of the expanded disparity search range SR2 is N, the restored depth information PT2' has a restored disparity range dp2' from 0 to N(M−1).

It should be noted that the restoring unit 160 mainly normalizes the compensated depth so that the units of the compensated depth information DPT2 and the basic depth information DPT0 are consistent. If the units of the depth information are originally consistent, there is no need to use the restore unit 160.

Then, in the step S270 of the FIG. 9, as shown in the FIGS. 3 and 10, the fusing unit 170 fuses the basic depth information PT2 and the restored depth information PT2' to obtain a fused depth information DM2. As shown in the FIG. 10, when the predetermined disparity search range SR0 is 0 to M−1 and the expansion magnification of the expanded disparity search range SR2 is N, the fused depth information DM2 has an integrated disparity range dp02 from 0 to N(M−1).

Through the above-mentioned pre-processing technologies, such as filtering the image, and the control of the disparity search range, the situation that some pixels or blocks cannot be correctly matched in the depth information processing can be improved, and then the fusion technology can be used to obtain a complete fused depth information DM2. In addition, the above-mentioned depth information processing can be performed by one depth generating unit 140 or by multiple depth generating units 140. Please refer to the following description.

Figures 12, 13:
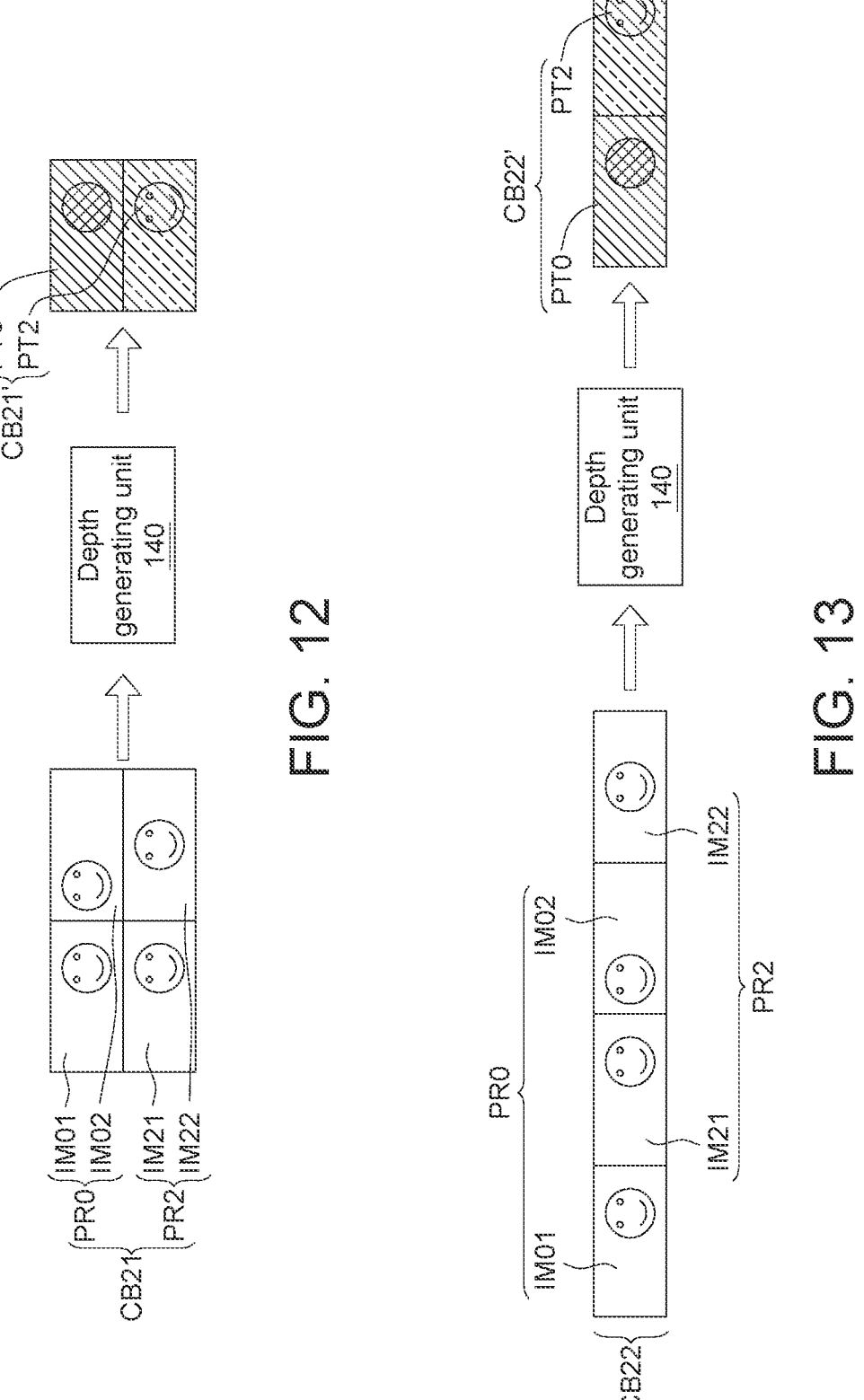
FIG. 12 illustrates a schematic diagram of one depth generating unit 140 processing a combined image CB21 including the original image group PR0 and a filtered image group PR2 according to an embodiment.
FIG. 13 illustrates a schematic diagram of one depth generating unit 140 processing a combined image CB22 including the original image group PR0 and the filtered image group PR2 according to another embodiment.

Please refer to FIG. 12, which illustrates a schematic diagram of one depth generating unit 140 processing the combined image CB21 including the original image group PR0 and the filtered image group PR2 according to an embodiment. In the FIG. 12, the original image group PR0 and the filtered image group PR2 are combined into the combined image CB21. The original image group PR0 is arranged at the first row of the combined image CB21, and the filtered image group PR2 is arranged at the second row of the combined image CB21. One depth generating unit 140 could perform the depth information processing on the combined image CB21 to simultaneously obtain the basic depth information PT0 and the compensated depth information PT2.

Please refer to FIG. 13, which illustrates a schematic diagram of one depth generating unit 140 processing a combined image CB22 including the original image group PR0 and the filtered image group PR2 according to another embodiment. In the FIG. 13, the original image group PR0 and the filtered image group PR2 are combined into the combined image CB22. The first image IM01 of the original image group PR0, the non-filtered first image IM21 of the filtered image group PR2, the second image IM02 of the original image group PR0 and the filtered second image IM22 of the filtered image group PR2 are arranged in sequence and located at the same row of the combined image CB22. One depth generating unit 140 could perform the depth information processing on the combined image CB22 to simultaneously obtain the basic depth information PT0 and the compensated depth information PT2.

Figure 14:
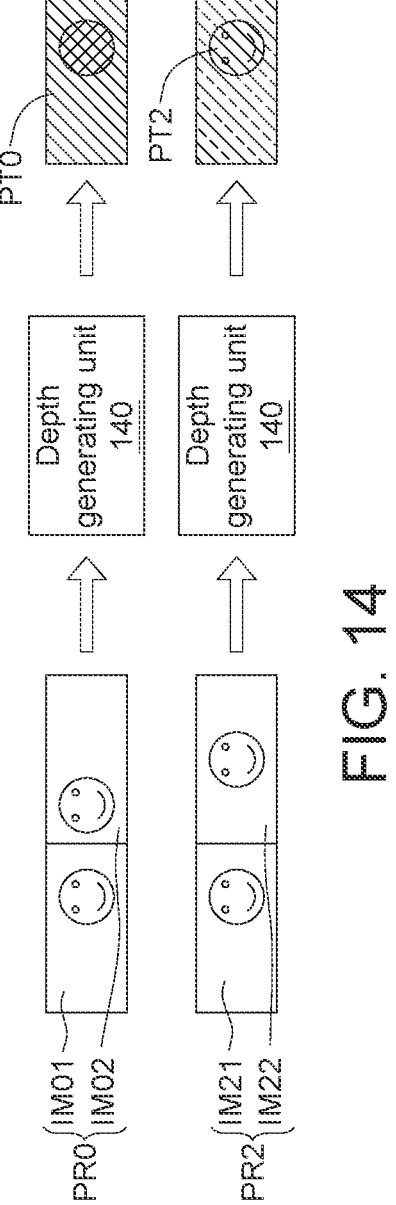
FIG. 14 illustrates a schematic diagram of two depth generating units 140 respectively processing a combined image CB230 including the original image group PR0 and a combined image CB232 including the filtered image group PR2 according to another embodiment.

Please refer to FIG. 14, which illustrates a schematic diagram of two depth generating units 140 processing the original image group PR0 and the filtered image group PR2 according to another embodiment. One depth generating unit 140 could perform the depth information processing on the first image IM01 and the second image IM02, and the other depth generating unit 140 could perform the depth information processing on the zero-shifted first image IM21 and the shifted second image IM22.

In the above embodiment, the predetermined disparity search range SR0 is linearly expanded at a fixed expansion rate to obtain the expanded disparity search range SR2. In another embodiment, the predetermined disparity search range SR0 could also be expanded in a nonlinear manner.

Figure 15:
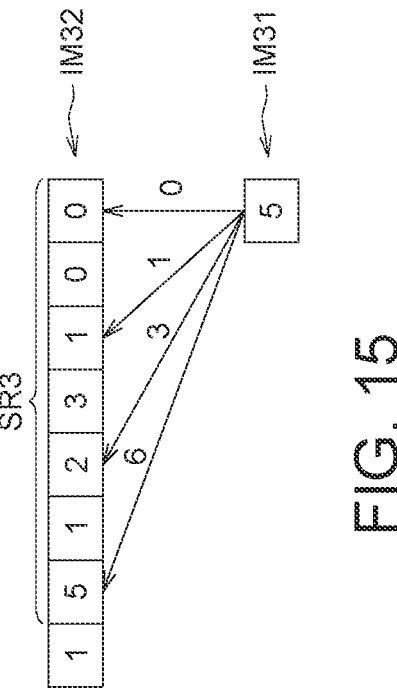
FIG. 15 illustrates a schematic diagram of an expanded disparity search range SR3 according to another embodiment.

Please refer to FIG. 15, which illustrates a schematic diagram of an expanded disparity search range SR3 according to another embodiment. In the FIG. 15, the expanded disparity search range SR3 is expanded in a nonlinear manner. For example, some non-linearly increasing disparity values, such as 0, 1, 3, 6, are the objects searched within by the expanded disparity search range SR3. Under the expanded disparity search range SR3, a non-filtered first image IM31 and a filtered second image In IM32 may have some blocks that can be paired correctly, so that the blocks that can be paired correctly are increased.

According to the above various embodiments, the situation that some pixels or blocks cannot be matched correctly can be improved by using the pre-processing technologies, such as shifting and filtering on the image, and the control of the disparity search range. Finally, the fusion technology could be used to obtain the complete fused depth information.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A depth information processing method, comprising:
   obtaining a first image and a second image of an original image group;
   performing a pixel shifting process on the original image group, to obtain a zero-shifted first image and a shifted second image of a shifted image group, wherein the zero-shifted first image is identical to the first image, the shifted second image is shifted by N pixels relative to the second image, and N is a positive integer;
   combining the original image group and the shifted image group, to obtain a combined image;
   performing a depth information processing on the combined image by using a predetermined disparity search range, to obtain an initial depth information, wherein the initial depth information has a basic depth information corresponding to the original image group and a compensated depth information corresponding to the shifted image group;
   dismantling the initial depth information to be the basic depth information and the compensated depth information;
   performing a numerical restoration process on compensated depth information to obtain a restored depth information; and
   fusing the basic depth information and the restored depth information, to obtain a fused depth information.

2. The depth information processing method according to claim 1, wherein the predetermined disparity search range is 0 to M−1, the basic depth information has a basic disparity range from 0 to 0+M−1, the restored depth information has a restored disparity range from N to N+M−1, and M is a positive integer.

3. The depth information processing method according to claim 2, wherein the fused depth information has an integrated disparity range from 0 to N+M−1.

4. The depth information processing method according to claim 1, wherein the original image group is arranged at a first row of the combined image, and the shifted image group is arranged at a second row of the combined image.

5. The depth information processing method according to claim 4, further comprising performing the depth information processing on the combined image to obtain the initial depth information with the basic depth information and the compensated depth information.

6. The depth information processing method according to claim 1, wherein the first image of the original image group, the zero-shifted first image of the shifted image group, the second image of the original image group and the shifted second image of the shifted image group are arranged in order and located at an identical row of the combined image.

7. The depth information processing method according to claim 6, further comprising performing the depth information processing on the combined image to obtain the initial depth information with the basic depth information and the compensated depth information.

8. The depth information processing method according to claim 7, further comprising performing the depth information processing on the first image and the second image, and another depth information processing on the zero-shifted first image and the shifted second image.

9. A depth information processing method, comprising:
   obtaining a first image and a second image of an original image group;
   performing a low-pass filtering process on the original image group to obtain a non-filtered first image and a filtered second image of a filtered image group, wherein the non-filtered first image is identical to the first image;
   combining the original image group and the filtered image group to obtain a combined image;
   performing a depth information processing on the combined image of the original image group by using a predetermined disparity search range, and performing the depth information processing on the combined image of the filtered image group of by using an expanded disparity search range to obtain an initial depth information, wherein the initial depth information has a basic depth information corresponding to the original image group and a compensated depth information corresponding to the filtered image group, the expanded disparity search range is N times the predetermined disparity search range, and N is a positive integer;
   dismantling the initial depth information to be the basic depth information and the compensated depth information;
   performing a numerical restoration process on the compensated depth information; and
   fusing the basic depth information and the compensated depth information to obtain a fused depth information.

10. The depth information processing method according to claim 9, wherein the predetermined disparity search range is 0 to M−1, the basic depth information has a basic disparity range from 0 to 0+M−1, the restored depth information has a restored disparity range of N to N(M−1), and M is a positive integer.

11. The depth information processing method according to claim 10, wherein the fused depth information has an integrated disparity range from 0 to N(M−1).

12. The depth information processing method according to claim 9, wherein the original image group is arranged at a first row of the combined image, and the filtered image group is arranged at a second row of the combined image.

13. The depth information processing method according to claim 12, wherein the depth information processing is performed on the combined image to obtain the initial depth information with the basic depth information and the compensated depth information.

14. The depth information processing method according to claim 9, wherein the first image of the original image group, the non-filtered first image of the filtered image group, the second image of the original image group and the filtered second image of the filtered image group are arranged in order and located at an identical row of the combined image.

15. The depth information processing method according to claim 14, wherein the depth information processing is performed on the combined image to obtain the initial depth information with the basic depth information and the compensated depth information.

16. The depth information processing method according to claim 9, wherein the depth information processing is performed on the first image and the second image, and another depth information processing on the zero-shifted first image and the shifted second image.

17. A depth information processing system, comprising:
   a converting unit, used to perform a pixel shifting process on a first image and a second image of an original image group, to obtain a zero-shifted first image and a shifted second image of a shifted image group, wherein the zero-shifted first image is identical to the first image, the shifted second image is shifted by N pixels relative to the second image, and N is a positive integer;
   a combining unit, used to combine the original image group and the shifted image group, to obtain a combined image;
   a depth generating unit, used to perform a depth information processing on the combined image by using a predetermined disparity search range, to obtain an initial depth information, wherein the initial depth information has a basic depth information corresponding to the original image group and a compensated depth information corresponding to the shifted image group;
   a dismantling unit, used to dismantle the initial depth information to be the basic depth information and the compensated depth information;
   a restoring unit, used to perform a numerical restoration process on the compensated depth information, to obtain a restored depth information; and
   a fusing unit, used to fuse the basic depth information and the restored depth information, to obtain a fused depth information.

18. The depth information processing system according to claim 17, wherein the predetermined disparity search range is 0 to M−1, the basic depth information has a basic disparity range from 0 to 0+M−1, the restored depth information has a restored disparity range from N to N+M−1, the fused depth information has an integrated disparity range from 0 to N+M−1, and M is a positive integer.

19. The depth information processing system according to claim 17, wherein the fused depth information has an integrated disparity range from 0 to N+M−1.

* * * * *